March 24, 1931. A. RÜHR 1,797,795
DEVICE FOR WELDING FINS TO TUBES
Filed Dec. 2, 1926 2 Sheets-Sheet 2

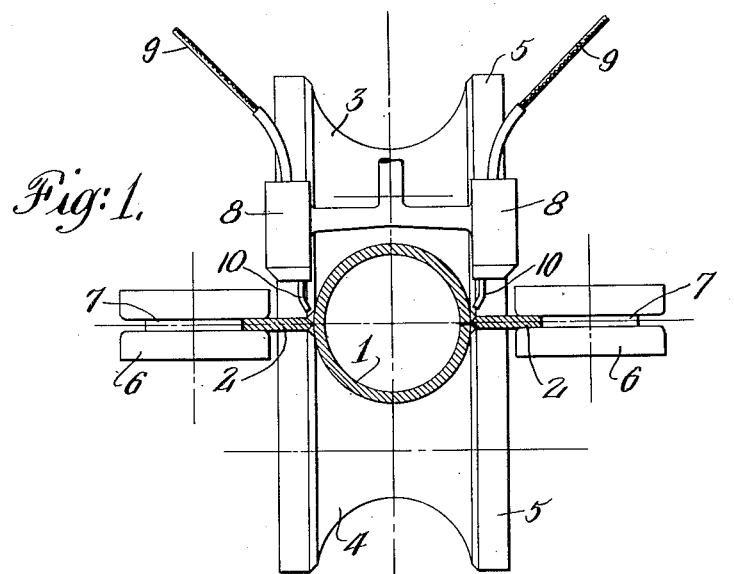
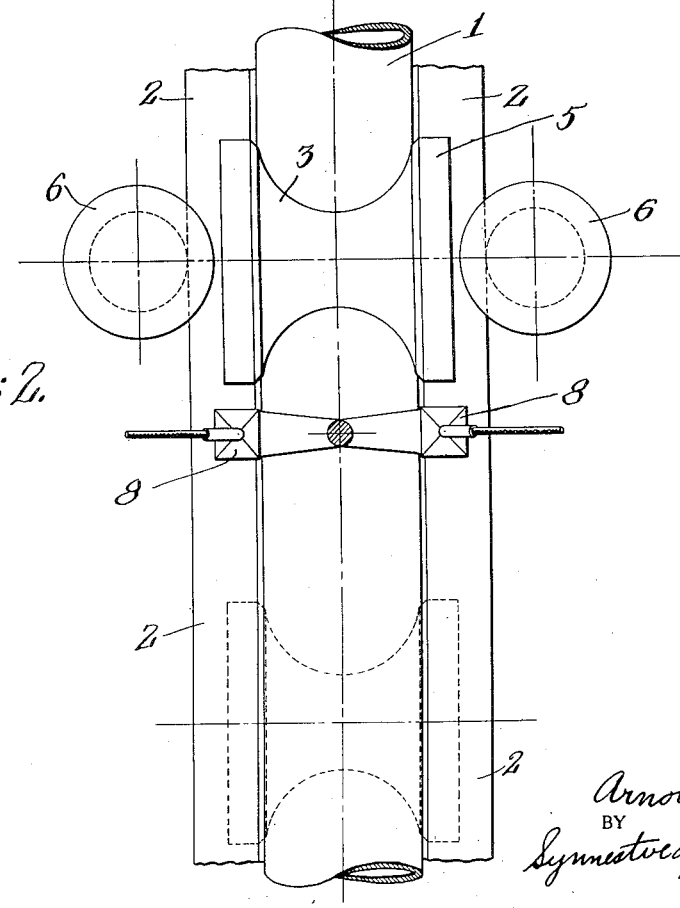

INVENTOR
Arnold Rühr
BY
Synnestvedt & Lechner
ATTORNEYS

Patented Mar. 24, 1931

1,797,795

UNITED STATES PATENT OFFICE

ARNOLD RÜHR, OF BERLIN, GERMANY, ASSIGNOR TO INTERNATIONAL COMBUSTION ENGINEERING CORPORATION, OF NEW YORK, N. Y., A CORPORATION OF DELAWARE

DEVICE FOR WELDING FINS TO TUBES

Application filed December 2, 1926, Serial No. 152,147, and in Germany December 4, 1925.

In general this invention relates to a device for welding fins to tubes and particularly to a device for welding longitudinally extending fins to tubes such, for example, as are employed in steam generating boilers. The nature, objects and advantages can best be understood by a consideration of the present state of the art.

According to present practice the tubes and fins are usually secured on some supporting table and welding metal is supplied to the joints between the fins and the tubes by means of longitudinally movable welding heads. These heads are usually mounted to reciprocate on a slide in the ordinary manner by a screw spindle.

It will be understood, that such welding machines must be of considerable dimensions on account of the great length of the tubes and that the same are correspondingly expensive. Working of such machines is likewise coupled with great expense, as every piece to be welded has to be mounted and demounted, making a continuous operation and full utilization of the machine impossible.

According to my invention I overcome these difficulties and obtain other objects and advantages which will appear hereinafter by arranging the welding heads stationary and making provision for moving the tubes and fins with respect thereto.

The appended drawing illustrates the preferred embodiment of the invetnion.

Fig. 1 of the drawing shows a tube and fins in cross-section with the supporting means and welding heads shown in elevation;

Fig. 2 shows a plan view of my improved apparatus;

Figure 3:
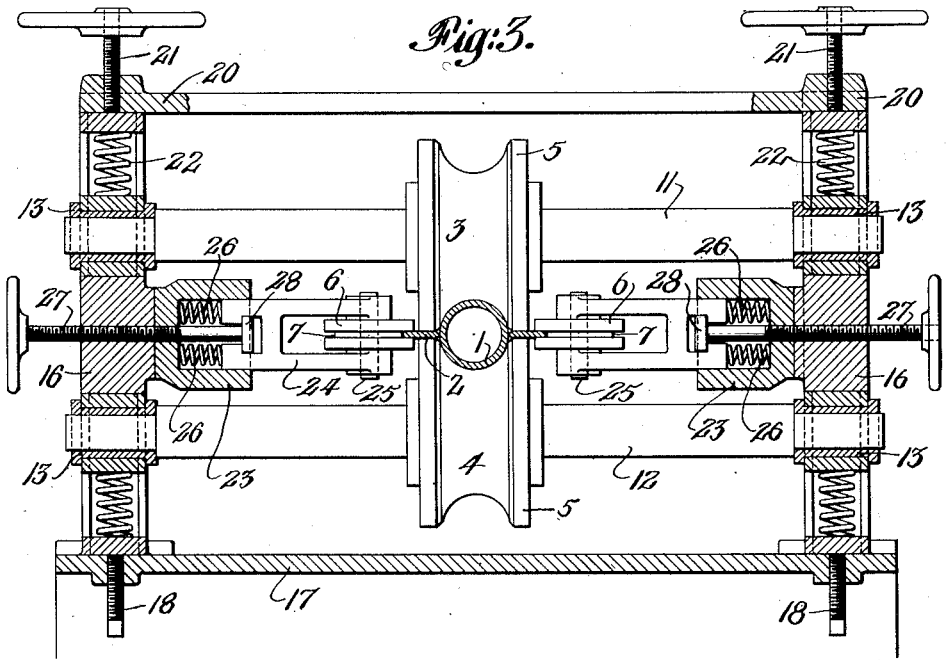
Figure 3 is a view partly in elevation and partly in vertical section illustrating the mounting of the supporting means for the rollers.

Referring now particularly to the drawings the reference numeral 1 indicates a suitable boiler tube and 2, 2 indicate fins positioned to be welded to the tube 1.

The tube is supported, as it is fed through the apparatus, by means of upper and lower grooved rollers 3 and 4, respectively, such rollers being provided with flat surfaces or rims 5 at their ends which cooperate in supporting a fin 2 at each side of the tube. The fins are retained adjacent the tube by means of rollers 6 mounted on vertical axes, such rollers being provided with grooves 7 adapted to engage the outer edges of the fins.

Welding heads 8, (see Figs. 1 and 2) to which the welding rods or metal 9 is supplied, are supported in any suitable manner above and adjacent the tube so that the welding head nozzles 10 depend in such a manner and direction that they will deliver the welding metal at the seams or joints between the tube and its fins. The welding rods or wires 9 may be fed to the heads 8 from any of the suitable reels well known in the welding art.

The heat employed for the welding operation is preferably produced by an electric current although it is to be understood that the source of heat is immaterial to the present invention.

It is to be noted that the edges of the fins 2 which abut the tube are somewhat beveled or "sharpened" so that only a relatively fine edge actually abuts against the tube. This provides a larger area with which the welding material may conveniently and effectively contact. Such a "sharpened" edge also practically eliminates the possibility of funnels or air bubbles forming between the tube and its fins and thereby improves the heat conducting capacity therebetween.

This particular configuration of fin is advantageous still further in permitting point-welding, according to which the fins will be welded to the tube only at intervals along their length and the intervening seams or joints will be filled with any suitable molten mass preferably having a relatively high coefficient of conduction. Such a mode of operation almost entirely obviates the noxious influence of welding upon the strength of the material and produces a finned tube having a relatively high heat conducting capacity.

Figure 4:
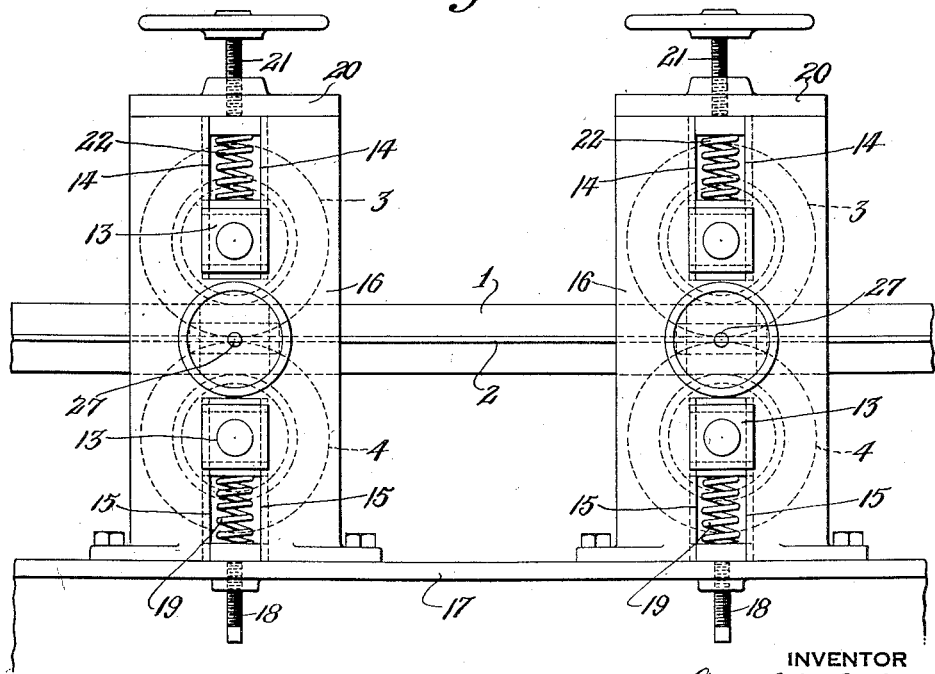
Figure 4 is a side elevational view of the mounting for the supporting and guiding rollers illustrated in Figure 3.

In Figs. 3 and 4 I have illustrated a suitable means for supporting the various feeding and guiding rollers and from inspection of those figures it will be seen that the rollers are resiliently mounted in order to hold the tubes and the fins in position to be welded.

The mounting for the grooved rollers 3 and 4 includes upper and lower shafts 11 and 12, respectively, the same being provided with bearing members 13 at their ends. The members or blocks 13 are mounted for vertical movement between the guides or jaws 14 and 15, the said guides being provided in supporting members 16 which are in the nature of H-shaped members. The guides 14 are adapted to receive the blocks 13 for the upper shafts 11 while the guides 15 are adapted to receive the blocks 13 of the lower shafts 12. Note also that the guides 14 open upwardly while the guides 15 open downwardly.

The H-shaped members 16 are preferably mounted on a suitable table 17 which is provided with adjusting bolts 18 positioned between and below the downwardly open jaws 15, the said bolts 18 serving to adjust the tension of the springs 19 for the lower bearing blocks 13. The upwardly opening jaws 14 are bridged by means of the members 20 which carry adjusting screws 21 adapted to control the tension of the upper springs 22 for the upper bearing blocks 13.

At the inside of the central portion of each of the H-shaped members 16 is arranged a cup-like member 23 adapted to receive the outer ends of the bifurcated members 24, the said members 24 serving to support the lateral guiding rollers 6 by means of the pins 25 passing therethrough. Springs 26 are arranged within the cup-like members 23 in such manner as to react between the bottoms of the cup-like members 23 and the outer ends of the bifurcated members 24. Adjusting screws 27 are threaded into the central portions of the H-shaped members 16 and are provided with a rotatable connection (indicated at 28 in Fig. 3) with the members 24 in order to provide an adjustment for the lateral rollers 6.

In considering the operation of the invention it is simply necessary to bear in mind that the tube and fins are fed through the guiding and supporting rollers 3 and 4 which latter are mounted to resiliently engage the tube and fins. The rollers 6 are also mounted to resiliently retain the fins adjacent the tube. Any of the rollers may be driven but I prefer to drive only the lower rollers 4 and permit the others to revolve merely as independent guide rollers.

It is obvious, of course, that rollers of various sizes and configurations may be employed to carry out the welding of fins and tubes of varying size and configuration.

Thus my invention contemplates a simple and effective method and means for welding fins to boiler tubes, the same providing a decided advantage over the art in that the tubes may be fed continuously through the apparatus. The work of a single welding apparatus unit is thus greatly accelerated as it is not necessary to stop the work periodically to remove a finished tube and mount a new one in position for welding.

I claim:

1. Apparatus for welding fins to tubes including a pair of rollers having grooves for engaging and feeding the tubes and flat surfaces at their ends for engaging and feeding the fins edgewise adjacent the tubes and stationary means for delivering welding material to the seams between the fins and the tubes, together with rollers having grooves for engaging the outer edges of the fins to retain the fins adjacent the tubes.

2. Apparatus for welding fins to tubes including a pair of cooperating rollers resiliently urged toward each other having grooves for engaging and feeding the tubes and flat surfaces at their ends for engaging and feeding the fins edgewise adjacent the tubes and stationary means for delivering welding material to the seams between the fins and the tubes, together with a second pair of rollers having grooves for engaging the outer edges of the fins to retain the fins adjacent the tubes.

3. Apparatus for welding fins to tubes including a pair of cooperating rollers resiliently urged toward each other having grooves for engaging and feeding the tubes and flat surfaces at their ends for engaging and feeding the fins edgewise adjacent the tubes and stationary means for delivering welding material to the seams between the fins and the tubes, together with a second pair of rollers resiliently urged toward each other having grooves for engaging the outer edges of the fins to retain the fins adjacent the tubes.

4. Apparatus for welding fins to tubes including rollers adapted to engage and position the fins adjacent to the tubes and feed both fins and tubes longitudinally, said rollers being arranged in two pairs, the rollers of each pair being mounted on substantially parallel axes and the axes of the rollers of one pair extending substantially at right angles to the axes of the rollers of the other pair; and stationary means for delivering welding material to the seams between the fins and the tubes.

5. Apparatus for welding fins to tubes including rollers adapted to engage and position the fins adjacent to the tubes and feed both fins and tubes longitudinally, said rollers being arranged in two pairs, the rollers of each pair being mounted on substantially parallel axes and the axes of the rollers of one pair extending substantially at right angles to the axes of the rollers of the other pair; and stationary means for delivering welding material to the seams between the fins and the tubes, together with means for resiliently urging said rollers to their fin and tube engaging position.

6. Apparatus for welding fins to tubes including a pair of cooperating rollers for engaging and feeding the tubes and fins longitudinally with the fins positioned edgewise adjacent to the tubes, a second pair of cooperating rollers for engaging the outer edges of the fins, means for resiliently urging the rollers of the second pair toward the tubes to retain the fins adjacent thereto and means for delivering welding material to the seams between the fins and the tubes.

7. Apparatus for welding fins to tubes including a pair of rollers having grooves for engaging and feeding the tubes and flat surfaces at their ends for engaging and feeding the fins adjacent the tubes and stationary means for delivering welding material to the seams between the fins and the tubes, together with means for resiliently retaining the fins adjacent to the tubes.

In testimony whereof I affix my signature.

ARNOLD RÜHR.